(12) United States Patent
Slutsky et al.

(10) Patent No.: US 10,816,659 B2
(45) Date of Patent: Oct. 27, 2020

(54) METHOD FOR EFFICIENT VOLUMETRIC INTEGRATION FOR 3D SENSORS

(71) Applicant: GM GLOBAL TECHNOLOGY OPERATIONS LLC, Detroit, MI (US)

(72) Inventors: Michael Slutsky, Kfar Saba (IL); Daniel I. Dobkin, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 347 days.

(21) Appl. No.: 15/979,963

(22) Filed: May 15, 2018

(65) Prior Publication Data

US 2019/0353778 A1 Nov. 21, 2019

(51) Int. Cl.
| | |
|---|---|
| *G01S 13/931* | (2020.01) |
| *G01S 13/89* | (2006.01) |
| *G05D 1/02* | (2020.01) |
| *G01S 7/285* | (2006.01) |
| *G01S 13/72* | (2006.01) |
| *G05D 1/00* | (2006.01) |
| *G01S 13/87* | (2006.01) |

(52) U.S. Cl.
CPC ............ *G01S 13/89* (2013.01); *G01S 7/285* (2013.01); *G01S 13/726* (2013.01); *G01S 13/931* (2013.01); *G05D 1/0257* (2013.01); *G05D 1/0274* (2013.01); *G01S 13/87* (2013.01); *G01S 2013/9323* (2020.01); *G01S 2013/9324* (2020.01); *G01S 2013/93271* (2020.01); *G05D 1/0088* (2013.01); *G05D 2201/0213* (2013.01)

(58) Field of Classification Search
CPC ............ G06T 7/70; G06T 2207/10028; G06T 2207/20076; G06T 2207/30261; G06T 17/005; G01S 13/726; G01S 13/87; G01S 13/89; G01S 13/931; G01S 13/9323; G01S 2013/9324; G01S 2013/93271; G01S 7/285; G05D 1/0088; G05D 1/0257; G05D 1/0274; G05D 2201/0213
See application file for complete search history.

(56) References Cited

U.S. PATENT DOCUMENTS

| | | | |
|---|---|---|---|
| 2018/0012370 A1* | 1/2018 | Aghamohammadi | .... G06T 7/50 |
| 2020/0018825 A1* | 1/2020 | Dia | ........ G01S 15/006 |
| 2020/0175315 A1* | 6/2020 | Gowaikar | ............ G05D 1/0231 |

* cited by examiner

*Primary Examiner* — Dale Moyer

(74) *Attorney, Agent, or Firm* — Cantour Colburn LLP

(57) ABSTRACT

A vehicle, system and method of mapping the environment is disclosed. The system includes a sensor and a processor. The sensor is configured to obtain a detection from an object in an environment surrounding the vehicle. The processor is configured to compute a plurality of radial components and a plurality of angular components for a positive inverse sensor model (ISM) of an occupancy grid, select a radial component corresponding to a range of the detection from the plurality of radial components and selecting an angular component corresponding to an angle of the detection from the plurality of angular components, multiply the selected radial component and the selected angular component to create an occupancy grid for the detection, and map the environment using the occupancy grid.

20 Claims, 10 Drawing Sheets

METHOD FOR EFFICIENT VOLUMETRIC INTEGRATION FOR 3D SENSORS

INTRODUCTION

The subject disclosure relates to methods for mapping an environment using one or more radar systems and, in particular, to using a negative inverse sensor model that is updatable via a quad-tree structure to form an occupancy grid to represent the environment.

Radar systems can be employed on vehicles to sense objects in an environment of the vehicle for the purpose of mapping the environment, or objects in the environment. Such maps can be used to navigate the vehicle through the environment without coming into contact with objects in the environment. One method of processing radar signals includes creating a volumetric occupancy grid that records locations of the object in the form of probabilities based on detections from the radar system. The occupancy grid can be created and updated using a dual inverse sensor model (ISM) that includes a positive ISM and a negative ISM. One important aspect of mapping an environment using an occupancy grid is being able to update the occupancy grid in order to reflect the current state of the environment and objects in the environment. Accordingly, it is desirable to provide a method of mapping the environment that updates at least the negative ISM quickly and efficiently.

SUMMARY

In one exemplary embodiment, a method of mapping the environment is disclosed. The method includes computing a plurality of radial components and a plurality of angular components for a positive inverse sensor model (ISM) of an occupancy grid, obtaining a detection at a sensor from an object in an environment surrounding the vehicle, selecting a radial component corresponding to a range of the detection from the plurality of radial components and selecting an angular component corresponding to an angle of the detection from the plurality of angular components, multiplying the selected radial component and the selected angular component to create an occupancy grid for the detection, and mapping the environment using the occupancy grid.

In addition to one or more of the features described herein, the ISM further comprises a negative ISM and a probability value of the negative ISM is assigned using a quad-tree structure of the occupancy grid. A node of the quad-tree structure corresponds to a solid angle and a first level of the quad-tree structure includes solid angle bins that combine to cover a field of view of the sensor. The method further includes partitioning a solid angle bin at a level of the quad-tree structure into a plurality of sub solid angles at a sub level of the quad-tree structure when the solid angle bin at the level is includes the detection. The method further includes assigning a probability value to a solid angle bin for which there is no detection, wherein the probability value reflects an absence of the detection in the solid angle bin. The method further includes combining the probability values from the negative ISM with a probability value from the positive ISM to create the occupancy grid. In various embodiments, the method includes navigating the vehicle with respect to the object based on the mapping of the environment.

In another exemplary embodiment, a system for mapping an environment at a vehicle is disclosed. The system includes a sensor and a processor. The sensors is configured to obtain a detection from an object in an environment surrounding the vehicle. The processor is configured to compute a plurality of radial components and a plurality of angular components for a positive inverse sensor model (ISM) of an occupancy grid, select a radial component corresponding to a range of the detection from the plurality of radial components and selecting an angular component corresponding to an angle of the detection from the plurality of angular components, multiply the selected radial component and the selected angular component to create an occupancy grid for the detection, and mapping the environment using the occupancy grid.

In addition to one or more of the features described herein, the processor is further configured to assign a probability value of a negative ISM of the occupancy grid using a quad-tree structure of the occupancy grid. A node of the quad-tree structure corresponds to a solid angle and a first level of the quad-tree structure includes solid angle bins that combine to cover a field of view of the sensor. The processor is further configured to partition a solid angle bin at a level of the quad-tree structure into a plurality of sub solid angles at a sub level of the quad-tree structure when the solid angle bin at the level includes the detection. The processor is further configured to assign a probability value to a solid angle bin for which there is no detection, wherein the probability value reflects an absence of the detection at the solid angle bin. The processor is further configured to combine the probability values from the negative ISM with a probability value from a positive ISM to create the occupancy grid. In various embodiments, the processor is configured to navigate the vehicle with respect to the object based on the mapping of the environment.

In yet another exemplary embodiment, a vehicle is disclosed. The vehicle includes a sensor and a processor. The sensor is configured to obtain a detection from an object in an environment surrounding the vehicle. The processor is configured to compute a plurality of radial components and a plurality of angular components for a positive inverse sensor model (ISM) of an occupancy grid, select a radial component corresponding to a range of the detection from the plurality of radial components and selecting an angular component corresponding to an angle of the detection from the plurality of angular components, multiply the selected radial component and the selected angular component to create an occupancy grid for the detection, and mapping the environment using the occupancy grid.

In addition to one or more of the features described herein, the processor is further configured to assign a probability value to a negative ISM of the occupancy grid using a quad-tree structure of the occupancy grid. A node of the quad-tree structure corresponds to a solid angle and a first level of the quad-tree structure includes solid angle bins that combine to cover a field of view of the sensor. The processor is further configured to partition a solid angle bin at a level of the quad-tree structure into a plurality of sub solid angles at a sub level of the quad-tree structure when the solid angle bin at the level includes the detection. The processor is further configured to assign a probability value to a solid angle bin for which there is no detection, wherein the probability value reflects an absence of the detection at the solid angle bin. The processor is further configured to combine the probability values from the negative ISM with a probability value from a positive ISM to create the occupancy grid.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
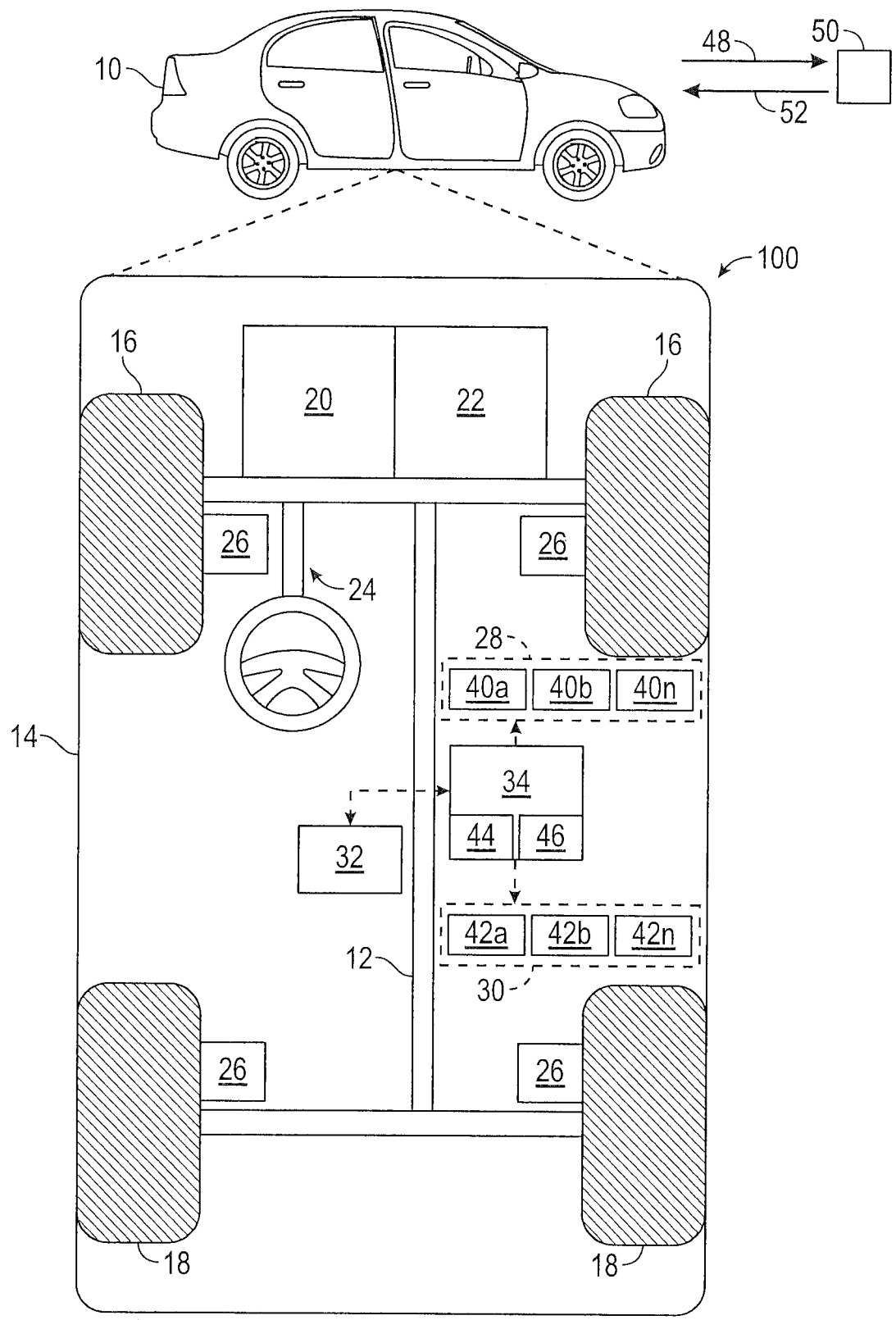
FIG. 1 shows a vehicle with an associated trajectory planning system depicted at in accordance with various embodiments.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 10 with an associated trajectory planning system depicted at 100 in accordance with various embodiments. In general, the trajectory planning system 100 determines a trajectory plan for automated driving of the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

In various embodiments, the vehicle 10 is an autonomous vehicle and the trajectory planning system 100 is incorporated into the autonomous vehicle 10 (hereinafter referred to as the autonomous vehicle 10). The autonomous vehicle 10 is, for example, a vehicle that is automatically controlled to carry passengers from one location to another. The autonomous vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, and at least one controller 34. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. In various embodiments, the vehicle 10 includes a radar system including an array of radar sensors, the radar sensors being located at various locations along the vehicle 10. In operation, a radar sensor sends out an electromagnetic pulse 48 that is reflected back at the vehicle 10 by one or more objects 50 in the field of view of the sensor. The reflected pulse 52 appears as one or more detections at the radar sensor.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as ventilation, music, lighting, etc. (not numbered).

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which includes an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

The trajectory planning system 100 navigates the autonomous vehicle 10 based on a determination of objects and/or their locations within the environment of the vehicle. In various embodiments the controller 34 performs calculations to record probabilities in an occupancy grid based on detections from the radar system of the vehicle 10. The processor uses the occupancy grid in order to make decisions for navigating the vehicle 10. Upon determining various parameters of the object, such as range, azimuth, elevation, velocity, etc., from the occupancy grid, the controller 34 can operate the one or more actuator devices 42a-n, the propulsion system 20, transmission system 22, steering system 24 and/or brake 26 in order to navigate the vehicle 10 with respect to the object 50. In various embodiments, the controller 34 navigates the vehicle 10 so as to avoid contact with the object 50.

In one aspect, the processor 44 creates an occupancy grid using a dual inverse sensor model (ISM). An occupancy grid is a three-dimensional representation of the environment of the vehicle 10. The occupancy grid represents a volume of the environment that can be sampled using the radar system and is therefore limited in range, azimuth and elevation. The occupancy grid is described using spherical polar coordinates ($\rho$, $\theta$, $\varphi$) centered at the sensor. The occupancy grid is partitioned into three-dimensional bins characterized by ($\rho$, $\theta$, $\varphi$) and stores or records probabilities for radar detections in bins corresponding to the range ($\rho$), azimuth ($\theta$) and elevation ($\varphi$) of the detection. When navigating a vehicle, the values of the occupancy grid are accessed in order to provide a probabilistic representation of the environment and of objects therein. The values within the occupancy grid can thus be used to inform the processor 44 of objects, allowing the processor 44 to perform operations at the vehicle 10 in order to prevent the vehicle 10 from making contact with the objects.

The occupancy grid is created and updated using a dual inverse sensor model (ISM) that includes a positive inverse sensor model and a negative inverse sensors model. An inverse sensor model is a model that specifies a distribution of state variables (i.e., in the occupancy grid) based on measurements. The positive ISM assigns a conditional occupancy probability to a bin of the occupancy grid based on a measurement indicating the presence of a detection at a corresponding location in the environment. The positive ISM uses probabilities to represent the presence of the object at a given location in the environment. The negative ISM tracks areas in which no detections occur and assigns suitable probabilities to the corresponding bins. In one embodiment, the positive ISM and negative ISM are updated separately using the radar observations, where radar observation includes regions or directions in which detections occur and regions or directions in which no detections are found. The regions or directions in which no directions are found (no-detection directions) are used to update the negative ISM and the regions or direction in which directions are found (with-detection directions) are used to update the positive ISM. The negative ISM and positive ISM are and then combined in order to create an updated dual ISM. The updated dual ISM is used to create a static occupancy grid.

Figure 2:
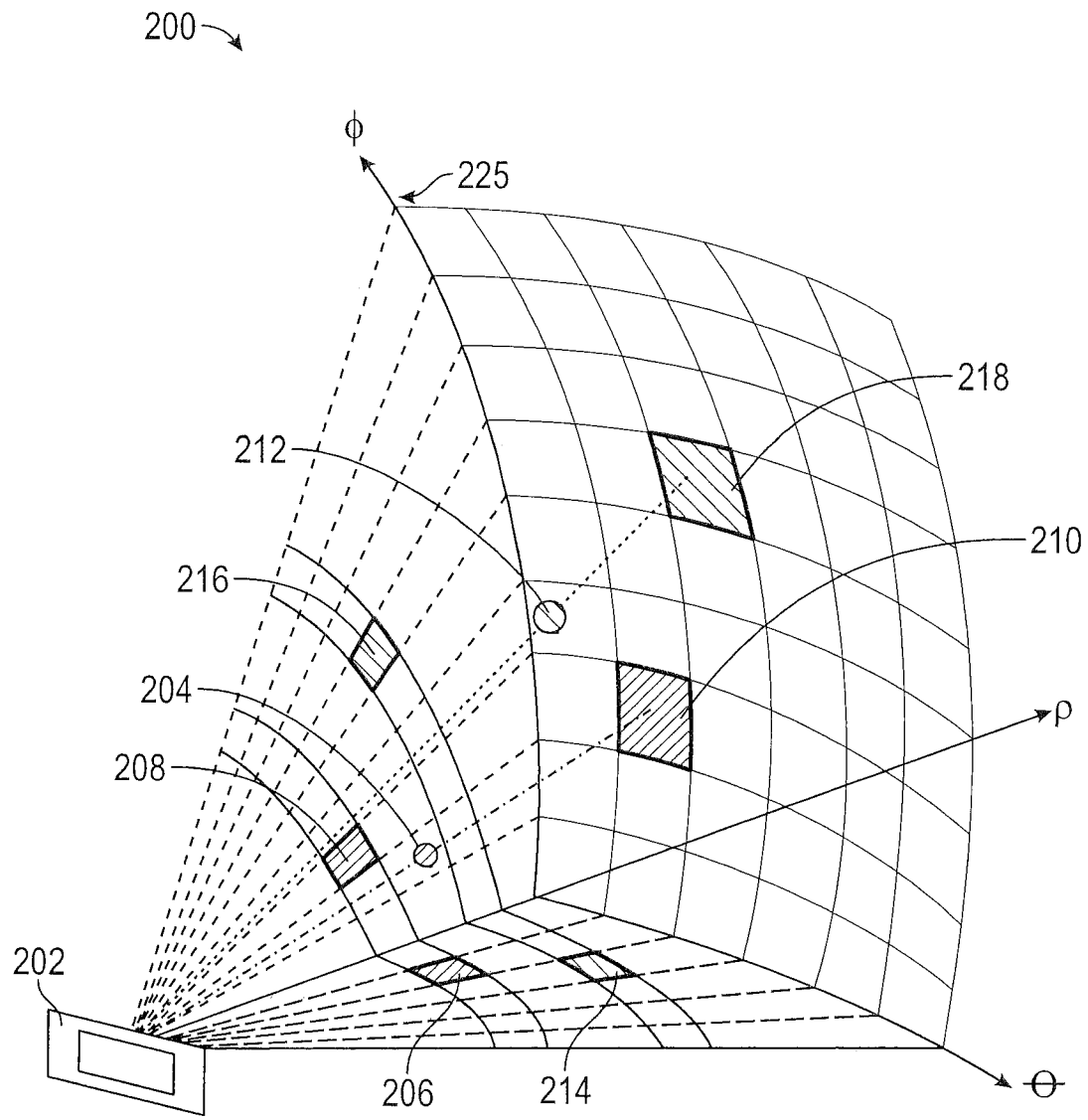
FIG. 2 shows an illustrative occupancy grid.

To derive an ISM, one starts with a probabilistic description of the sensor, i.e., a distribution of sensor readings given a target at a certain location X. Bayes theorem is applied in order to obtain the probability of the target being at location X given the sensor reading. In order to create the occupancy grid, the representation of the space surrounding the vehicle 10 is discretized by introducing a three-dimensional grid, such as shown in FIG. 2. The grid cells of the three-dimensional grid are considered to be independent of each other so that their occupancy probabilities satisfy the equation:

$$p(m_1, m_2, \ldots, m_N | X) = \Pi_{k=1}^{N} (m_k | X) \qquad \text{Eq. (1)}$$

where $m_k$=0 or 1. An empty $k^{th}$ grid point has $m_k$=0 and an occupied $k^{th}$ grid point has $m_k$=1.

FIG. 2 shows an illustrative occupancy grid 200. A spherical polar coordinate system 225 is centered on a sensor 202 of a radar system. The sensor 202 is located at the origin of the spherical polar coordinate system 225. For illustrative purposes, a first detection 204 and a second detection 212 are shown. For range variables, the first detection 204 lies within a particular range bin. For angular variables, the first detection 204 lies within an azimuthal bin 206 and an elevation bin 208. The azimuthal bin 206 and elevation bin 208 define a first solid angle bin 210 covering an area on a spherical surface centered at the sensor 202. The first solid angle bin 210 can be determined by projecting a ray from the sensor 202 through the first detection 204 onto the spherical surface and recording the bin through which the ray passes. Similarly, the second detection 212 lies within an azimuthal bin 214 and an elevation bin 216. The azimuthal bin 214 and elevation bin 216 define a second solid angle bin 218 of the spherical surface. The second solid angle bin 218 can also be determined by projecting a ray from the sensor 202 through the second detection 212 onto the spherical surface and recording the bin through which the ray passes.

In various embodiments, it is useful to take a logarithm of the probability (i.e., the "odds") in order to work with log(probability) or "log(odds)". An odds ratio is defined as the ratio between the probability of a cell being occupied and the probability of the cell being empty, which is given by Eq. (2):

$$O_k = \frac{p(m_k = 1 \mid X)}{p(m_k = 0 \mid X)} = \frac{p(m_k = 1 \mid X)}{1 - p(m_k = 1 \mid X)} \quad \text{Eq. (2)}$$

Using the logarithm of the odds $O_k$ produces a log(odds) values $L_k$:

$$L_k = \log O_k = \log\left[\frac{p(m_k = 1 \mid X)}{1 - p(m_k = 1 \mid X)}\right] \quad \text{Eq. (3)}$$

The log(odds) values simplify the process of updating the ISMs because they are additive in the logarithm domain. They can also be computed recursively for any iteration n using simple addition:

$$L_k^n = L_k^{n-1} + \Delta L_k^n - L_k^0 \quad \text{Eq. (4)}$$

where $\Delta L_k^n$ is the change in the log-likelihood at cell k following measurements taken at time n. $\Delta L_k^0$ is often, but not necessarily, taken to be zero.

The positive ISM is used to estimate $\Delta L_k^n$ at various locations with detection bins in the occupancy grid therefore is used to estimate occupancy probabilities at the with-detection bins of the occupancy grid for a selected moment in time. Due to high angular resolution, high detection probability and low false alarm rates, positive ISM models are represented by delta function-like along the azimuth and elevation.

For the positive ISM, the spatial uncertainties in detections are characterized by variances ($\sigma_\rho^2$, $\sigma_\theta^2$, $\sigma_\varphi^2$) in range, azimuth and elevation, respectively. These uncertainties are considered to be uncorrelated. In one embodiment, the probability density function for a detection is approximately Gaussian, as shown in Eq. (5):

$$p(\rho,\theta,\varphi) \sim N(\rho-\rho_0,\sigma_\rho^2) N(\theta-\theta_0,\sigma_\theta^2) N(\varphi-\varphi_0,\sigma_\varphi^2) \quad \text{Eq. (5)}$$

A detection i at location $(\rho_i, \theta_i, \varphi_i)$ with intensity $I_i$ influences cells inside volume $\Delta\Omega^{(i)} = [0 \leq \rho \leq \rho_i + 3\sigma_\rho, \sigma_i \pm 3\sigma_\theta, \varphi_i \pm 3\sigma_\varphi]$. For a cell M that is fully or partially inside $\Delta\Omega$, the conditional occupancy probability changes by:

$$\Delta P_{pos}^{(i)}(M) = W(I_i) \int_{\Delta\Omega^{(i)} \cap M} p^{(i)}(\rho,\theta,\varphi) d\Omega \quad \text{Eq. (6)}$$

where $W(I_i)$ is an empiric weight factor that considers stronger detections to have a larger contribution to the occupancy probability than weaker detections.

For ease of storage and increasing updating speed, the occupancy grid stores the log(odds) rather than odds. The log(odds) for a bin of the positive ISM can be updated using:

$$L_n(M) = L_{n-1}(M) + \Sigma_i \log\left(\frac{\Delta P_{pos}^{(i)}(M)}{P_{FA}}\right) \quad \text{Eq. (7)}$$

The positive ISM can be computed using brute force by calculating the integral:

$$\Delta P_{pos}^{(i)}(M) \propto \int_{\Delta\Omega^{(i)} \cap M} p_{pos}^{(i)}(\rho,\theta,\varphi) d\Omega \quad \text{Eq. (8)}$$

which can prove to be inefficient and time-consuming. However an approximation of the interval can be calculated by separating or factoring Eq. (8) into its angular and radial components, as shown in Eq. (9):

$$\int_{\Delta\Omega^{(i)} \cap M} p^{(i)}(\rho,\theta,\varphi) d\Omega = \int_{\Delta\Omega^{(i)} \cap M} p_{ang}^{(i)}(\theta,\varphi) \cos\theta \, d\Omega \, d\varphi \times \int_{\Delta\Omega^{(i)} \cap M} p_{rad}^{(i)}(\rho) \rho^2 d\rho \approx P_{ang}(\theta_i,\varphi_i,M) \times P_{rad}(\rho_i,M) \quad \text{Eq. (9)}$$

The angular and radial components can be considered to be independent of each other. Therefore, angular probability values can be determined for the angular component and radial probability values can be determined from the radial component and these probability values can be multiplied together in order to determine a probability value of a bin of the positive ISM. Factoring Eq. (9) allows for calculating $P_{ang}(\theta_i, \varphi_i, M)$ and $P_{rad}(\rho_i, M)$ values previously so that such values can be stored in a database and quickly accessed. To calculate the probabilities, the values are drawn from the database and multiplied together. In the radial direction, the behavior of $+\Delta L_n^k$ is postulated using the probability graphs shown in FIGS. 3a and 3b.

Figure 3A:
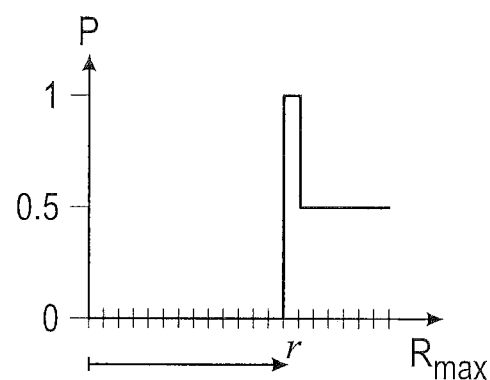
FIG. 3a (prior art) shows a radial probability graph for creating or updating an occupancy grid based on an object's location.

FIG. 3a (prior art) shows a radial probability graph 300 for creating or updating an occupancy grid based on an object's location. For illustrative purposes, the object is located a range or distance r from the sensor. The probability associated with the detection at range r is given by a probability 1. For the distances between the sensor and the object, the probability value is zero, since a detection at range r indicates no objects between the sensors and the object. The remaining distance between the object and the maximum range can be assigned a probability value of ½, indicating that there is an even probability that another object is located between the object and the maximum range, even if it is undetected.

Figure 3B:
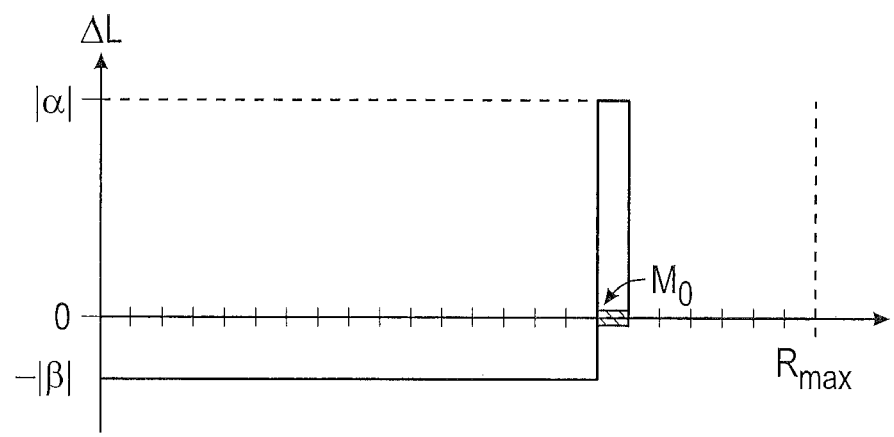
FIG. 3b (prior art) shows a log(odds) model for a radial probability graph of an object located at a selected range.

FIG. 3b (prior art) shows a log(odds) model for a radial probability graph 302 of an object located at range $M_0$ from the sensor. The probability associated with detection at $M_0$ is given by a positive probability $|\alpha|$ Since a detection is located at $M_0$, the likelihood of an object between the sensor and $M_0$ is low. Otherwise, the object would be detected at a different radial location. Thus a negative probability $-|\beta|$ is assigned to the radial distances between the sensor and $M_0$. The remaining distance between the location $M_0$ and the maximum range can be assigned a zero probability value.

Figure 4:
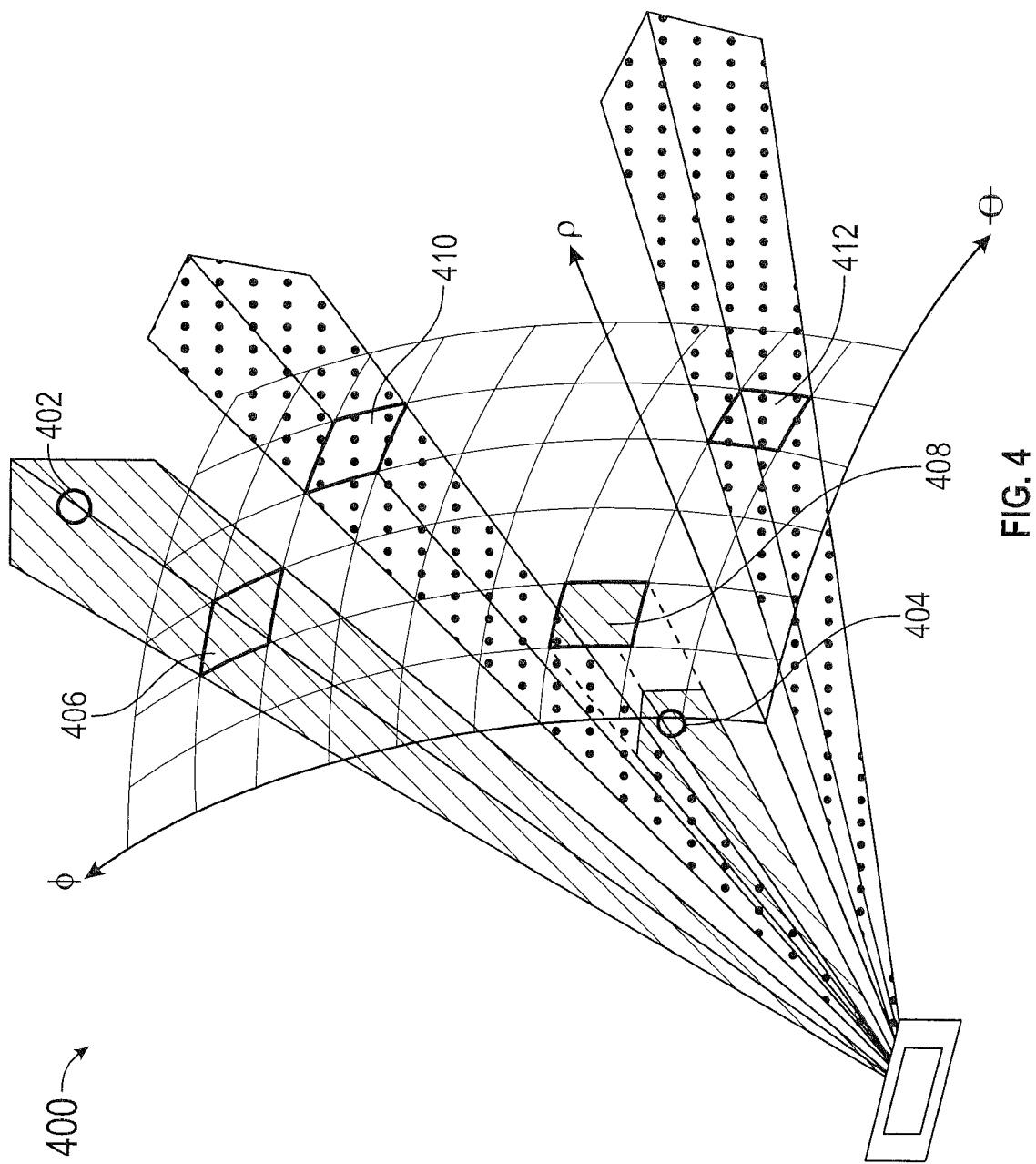
FIG. 4 shows an occupancy grid illustrating regions of no detections.

FIG. 4 shows an occupancy grid 400 illustrating with-detection regions and no-detection regions. The occupancy grid 400 shows a cross-section of a surface area of the occupancy grid highlighting regions of positive detection (with-detection regions) and negative detection (no-detection regions). Positive regions 406 and 408 are filled with probability values or log(odds) values using rules of the positive ISM details above with respect to FIGS. 2 and 3. Illustrative regions 410 and 412 are regions in which there are no detections. Thus, it is useful to be able to update grid probability values to represent the lack of detections associated with the appropriate azimuth and elevation. The negative ISM discussed herein updates the occupancy grid 400 for no-detection regions.

The negative ISM expresses the fact that if a certain direction in space includes no detections, the occupancy probability within the corresponding solid angle bin should decrease or go down. The negative ISM induces negative changes in the occupancy likelihood in cells of the occupancy grid for which there is a lack of detections in the corresponding direction of arrival (no-detection direction). Therefore, a probability value in a selected bin of the occupancy grid due to the presence of a detection in the direction corresponding to the bin during a previous time step can updated and reduced when no detections are occurring in the direction during more recent time steps. The log(odds) for a direction in which there is no detection can be provided by Eq. (10):

$$\Delta LO_{neg}(\rho) = \log\left(\frac{1 - p_e(\rho)}{1 - P_0}\right) \quad \text{Eq. (10)}$$

for which:

$$p_e(\rho) = \beta(\rho_{max} - \rho) \quad \text{Eq. (11)}$$

where $\rho_{max}$ is a maximum range of the sensor and $P_0$ is a model parameter of the sensor. Since for any radar, the deduction probability decreases with distance, the negative offset of Eq. (10) decreases for bins of the occupancy grid at longer ranges. In an alternative embodiment, the negative ISM can assume a linear decay of the log-odds with range, as shown in Eq. (12):

$$\Delta L_{neg}(\rho) = -|\alpha| - |\beta|(\rho_{max} - \rho) \quad \text{Eq. (12)}$$

Figure 5:
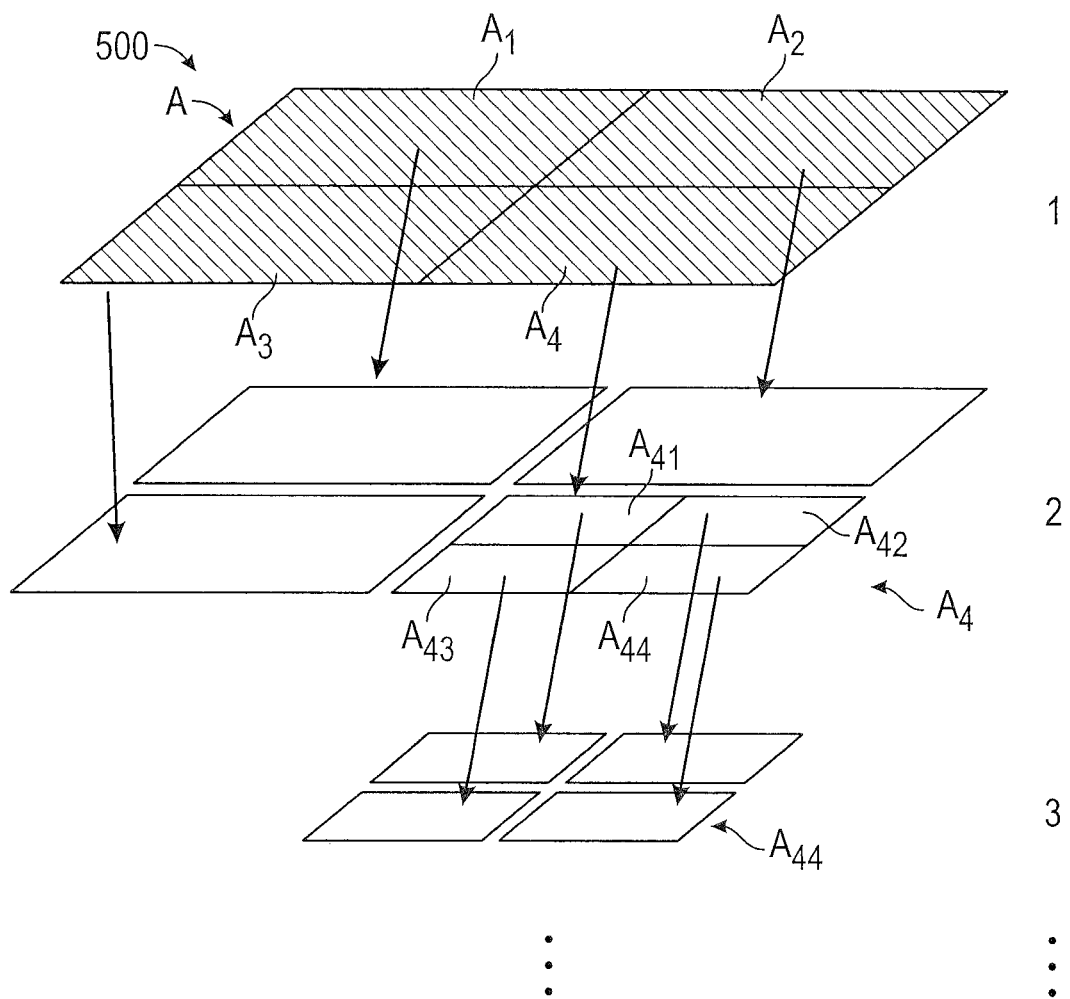
FIG. 5 shows an illustrative quad-tree structure that can be used to store and update probability values for a negative ISM.

FIG. 5 shows an illustrative quad-tree structure 500 that can be used to store and update probability values for a negative ISM. The quad-tree structure includes a plurality of levels, with each level including nodes in the form of solid angle bins. At each level, the plurality of nodes for the level cover a selected solid angle of the sensor. In one embodiment, the selected solid angle is the field of view of a sensor. A node or surface area at one level is related to nodes at a lower level by a branching operation. Referring first to level 1, the area A covers a selected solid angle of the sensor. The area A can be partitioned into four separate solid angle areas ($A_1$, $A_2$, $A_3$, $A_4$) at the second level via the branching operation. The entirety of the solid angle areas ($A_1$, $A_2$, $A_3$, $A_4$) of the second level covers the area A at the first level. Each of these solid angle areas ($A_1$, $A_2$, $A_3$, $A_4$) can be further partitioned via the branching operation into four solid angles at a third level. For illustration, solid angle A4 at the second level is partitioned into four solid angle areas ($A_{41}$, $A_{42}$, $A_{43}$, $A_{44}$). This process continues until a level is reaches at which no further partitioning of the solid angle is possible or desirable, either by a resolution limit of the sensor or a resolution default selected by a user.

Figure 6:
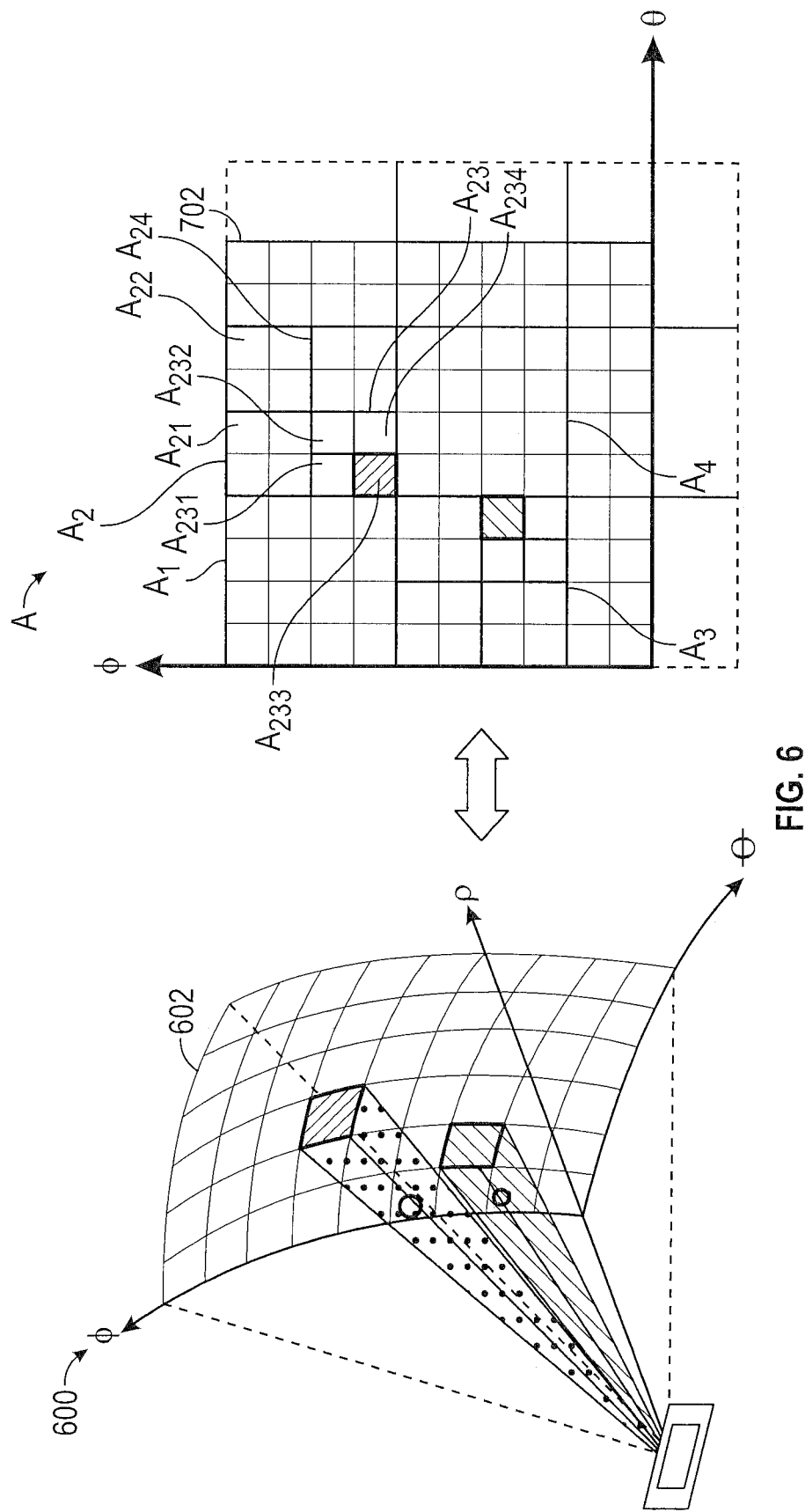
FIG. 6 illustrates us of the quad-tree structure of FIG. 5 to fill an occupancy grid using a negative ISM.

FIG. 6 illustrates use of the quad-tree structure of FIG. 5 to fill an occupancy grid 600 using a negative ISM. An illustrative solid angle 602 of an angular component of an occupancy grid 600 is shown on the left with two detections. On the right, the solid angle 602 of the angular component is shown. Bins for which the detections are present are marked for illustrative purposes. A portion of the solid angle 602 is covered by area A at a first level of a quad-tree structure. Using the branching operation, the area A is partitioned into smaller areas $A_1$, $A_2$, $A_3$ and $A_4$.

The detections area present in areas $A_2$ and $A_3$, whereas areas $A_1$ and $A_4$ have not detections present. In order to create the negative ISM. Negative ISM probabilities, such as discussed in Eqs. (8)-(10) are entered into those bins (at the lowest level of the occupancy grid) that are within areas $A_1$ and $A_4$. However, areas $A_2$ and $A_3$ are partitioned at a next level of the quad-tree structure, because detections are found within these areas.

For ease of explanation, we discuss only the area $A_2$. Area $A_2$ (a second level node) is partitioned into areas $A_{21}$, $A_{22}$, $A_{23}$ and $A_{24}$. Areas $A_{21}$, $A_{22}$ and $A_{24}$ are devoid of detections. Therefore, suitable negative ISM probabilities can be entered into their related bins. Area $A_{23}$ however includes a detection and is therefore partitioned into areas at the next (third) level of the quad-tree structure.

The process continues in this manner: when an area at one level of the quad-tree structure has no detections therein, the bins associated with the area are assigned a probability value for the negative ISM; when an area has a detection therein, the area is subdivided into smaller areas at the next level of the quad-tree structure.

The area $A_{23}$ is therefore partitioned into areas $A_{231}$, $A_{232}$, $A_{233}$ and $A_{234}$. For illustrative purposes, these areas are at the last level of the quad-tree structure. Therefore, areas $A_{231}$, $A_{232}$ and $A_{234}$ are assigned negative ISM probability values. The area $A_{233}$ can be assigned a value using a positive ISM value computed using the Eq. (9). This process can also be used to partition area $A_3$ with respect to the other detection shown in FIG. 7.

In various embodiments, the processor 44 creates the negative ISM using the quad-tree structure of FIGS. 5 and 6. The negative ISM values can be stored in memory in a look-up table for ease of access. The use of the quad-tree structure increases a speed and efficiency for forming the negative ISM.

Once the negative ISM and the positive ISM have been created and/or updated, they are combined into a dynamic occupancy grid. The dynamic occupancy grid therefore includes bins that have an associated dynamic probability, meaning the probability associated with the bin changes with each new time step or each new incoming set of detections. For a bin in which a detection was recorded in a first time step, but in subsequent time steps no detection was recorded, the current probability is altered due to the negative ISM so that the bin has an associated probability that reflects the fact that no detections have been recorded more recently. In other words the probability that is assigned to the bin due to the detection in the first time step is reduced over time due to corrections using the empty space weight.

Figure 7:
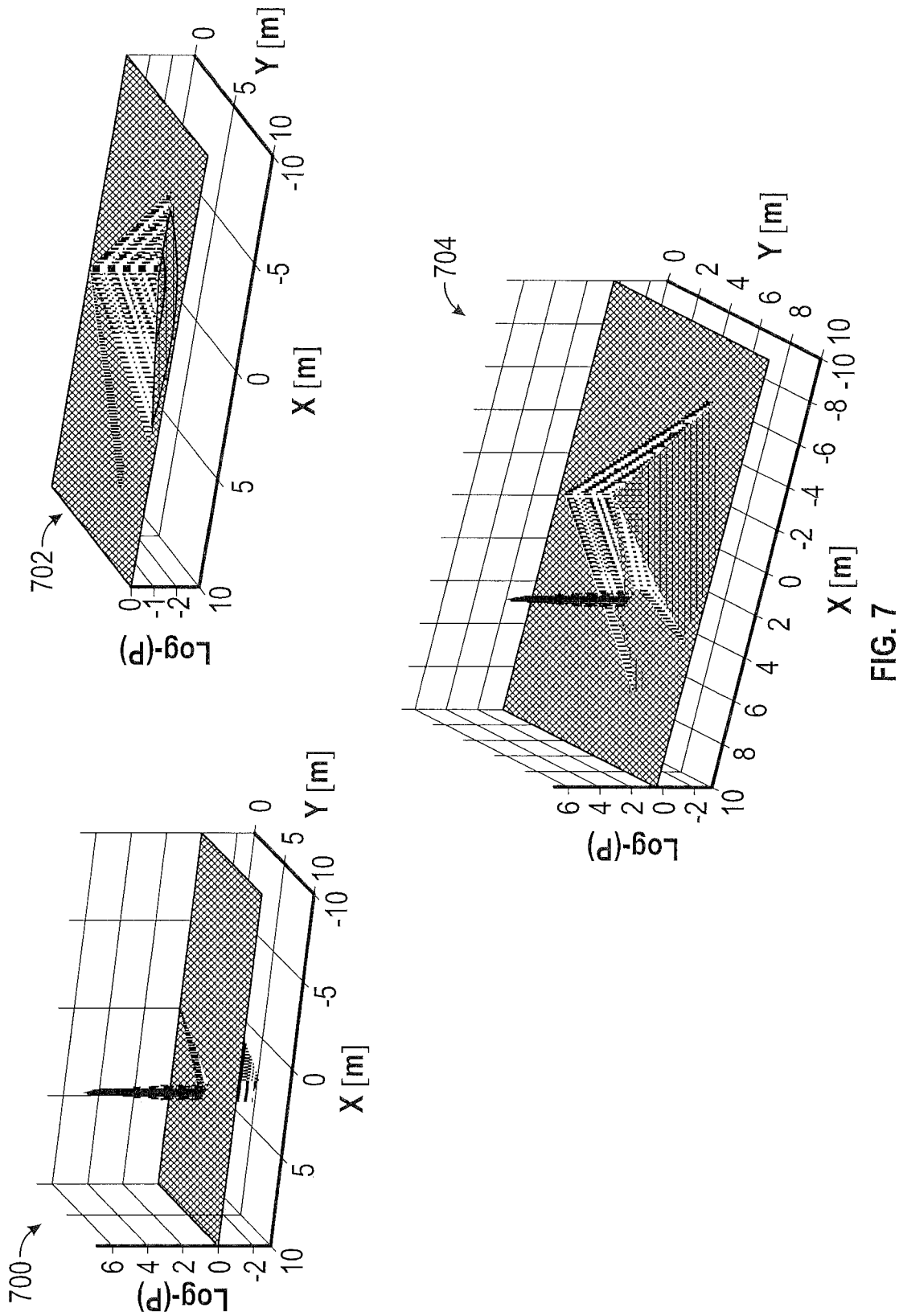
FIG. 7 shows positive ISM, a negative ISM, and a dual ISM for an occupancy grid.

FIG. 7 shows a positive ISM 700, a negative ISM 702, and a dual ISM 704 for the occupancy grid that combines the values of positive ISM 700 and the values of the negative ISM 702. The negative ISM 702 influences all of the bins in the no-detection directions within the field of view but does not affect bins in with-detection directions. On the other hand, for the positive ISM 700, the log(odds) are zero except inside a narrow angle around a detection. Inside this angle, the log(odds) are as indicated by the radial graph of FIG. 3b.

By updating the occupancy grid using both the positive ISM 700 and the negative ISM 702, the probability values associated with the bins of the occupancy grid changes with each new time step or each new incoming set of detections to reflect the a current state of the environment of the vehicle.

Figure 8:
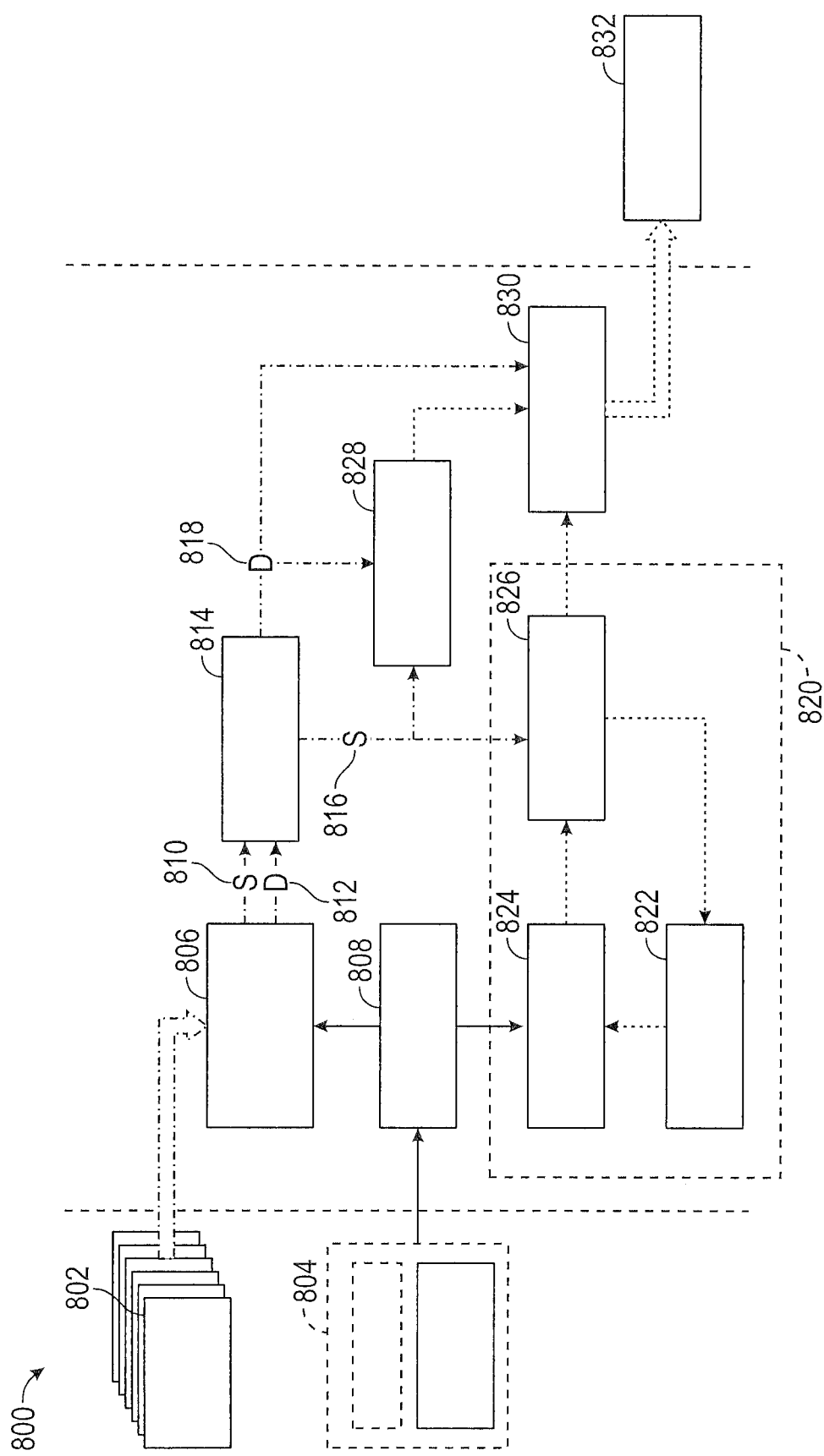
FIG. 8 shows a flow diagram illustrating a method for producing an occupancy grid that dynamically represents an environment of the vehicle of FIG. 1.

FIG. 8 shows a flow diagram 800 illustrating a method for producing an occupancy grid that dynamically represents the environment of the vehicle 10. A detection system, such as a radar system 802, obtains one or more detections 806. The radar system 802 includes a sensor that obtains detections related to objects within an environment of the vehicle during each of a plurality of time-separated frames. The radar system 802 obtains signals or detections 806 based on a range, azimuth and elevation of an object as well as its Doppler frequency or velocity. In the angular directions, the detections 806 are defined over a solid angle defined by the azimuth and elevation limits of the sensor. An odometer 804 or other suitable velocity meter provides a speed of the vehicle 10 to a self-motion estimation module 808. The motion of the vehicle is provided to the radar detections in order to separate the detections into a static set 810 of detections and a dynamic set 812 of detections. The static set 810 includes objects within the environment that do not move or are stationary within the environment, such as parked vehicles, buildings, signs, and other permanent fixtures in the environment. The dynamic detections 806 are related to objects that move within the environment, such as moving vehicles, pedestrians in motion, bicyclists, etc.

The static set 810 of detections and the dynamic set 812 of detections are provided to a clustering and outlier removal module 814 that filters the detections to remove noisy signals from the static set 810 of detections and dynamic set 812 of detections. In addition, the detections are grouped into clusters depending on their relative proximity to each other. Outlier detections are generally removed from consideration.

From clustering and outlier removal module 814, the filtered static set 816 of detections and the filtered dynamic set 818 of detections are provided to an empty space update module 828. The empty space update module 828 creates an occupancy grid that records the locations at which no detections are found in a selected frame. The record of empty space can be used along with the updated static occupancy grid 826 in order to update a dynamic occupancy grid 830 to changes to reflect the current nature of objects in the environment of the vehicle in the form of a dynamic occupancy grid 832.

The filtered static detections 816 are provided to an update loop 820 that updates a static occupancy grid in order to reflect the changing nature of the environment. The update loop 820 includes a static occupancy grid history 822 that stores the previous version of the static occupancy grid. The static occupancy grid history 822 and the velocity of the vehicle is used to resampling the static occupancy grid. The resampled occupancy grid 824 and the filtered static detections 816 are used to produce an updated static occupancy grid 826. For a subsequent updating step, the updated static occupancy grid 826 is used as the static occupancy grid history 822. The updated static occupancy grid 826 is provided to a dynamic occupancy update module 830 in order to provide a dynamic occupancy grid 832.

Figure 9:
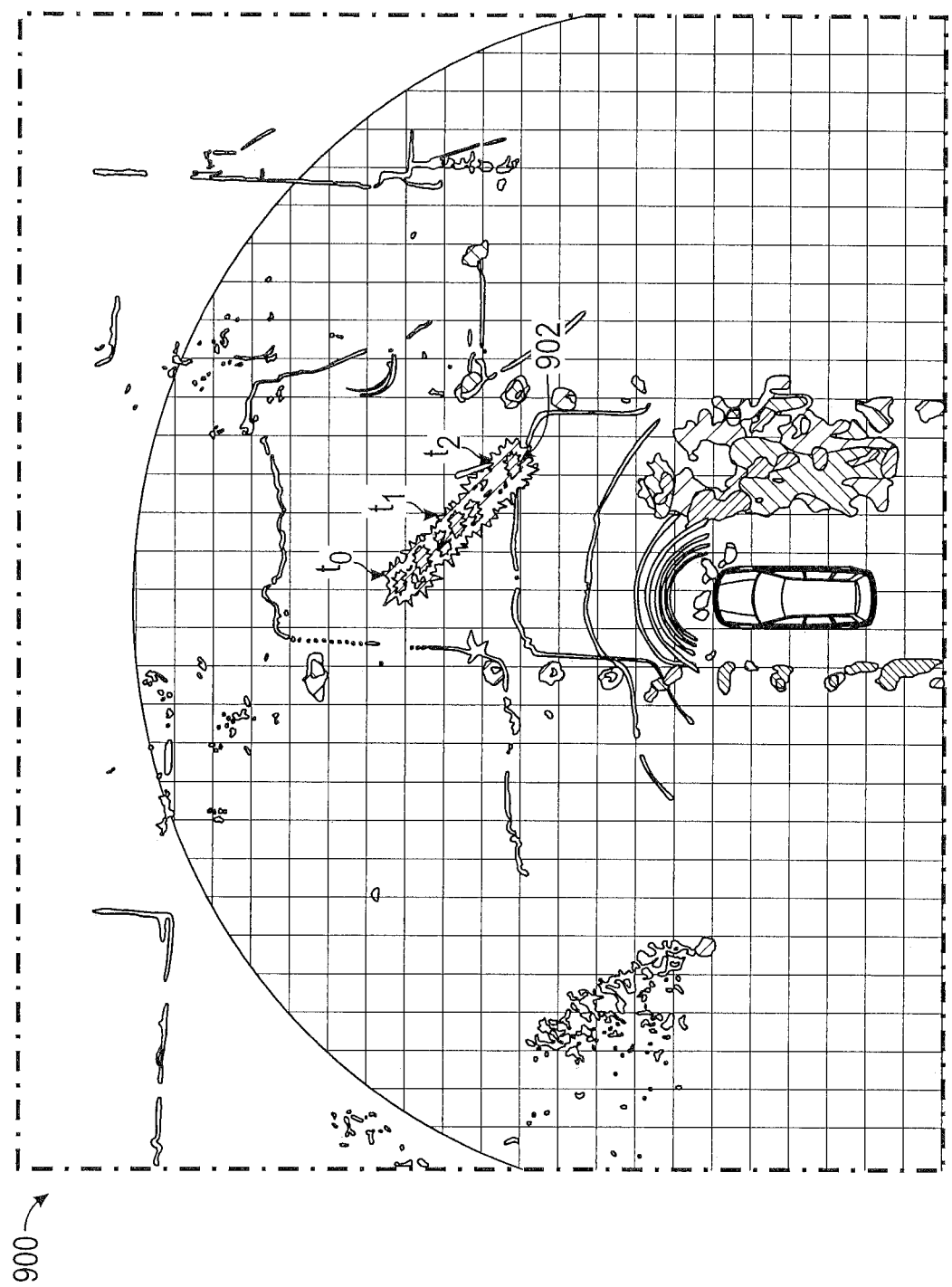
FIG. 9 shows a display of an illustrative radar field in a scenario in which an object is passing in front of the vehicle, wherein the radar field is formed from an occupancy grid that does not use the negative ISM.
Figure 10:
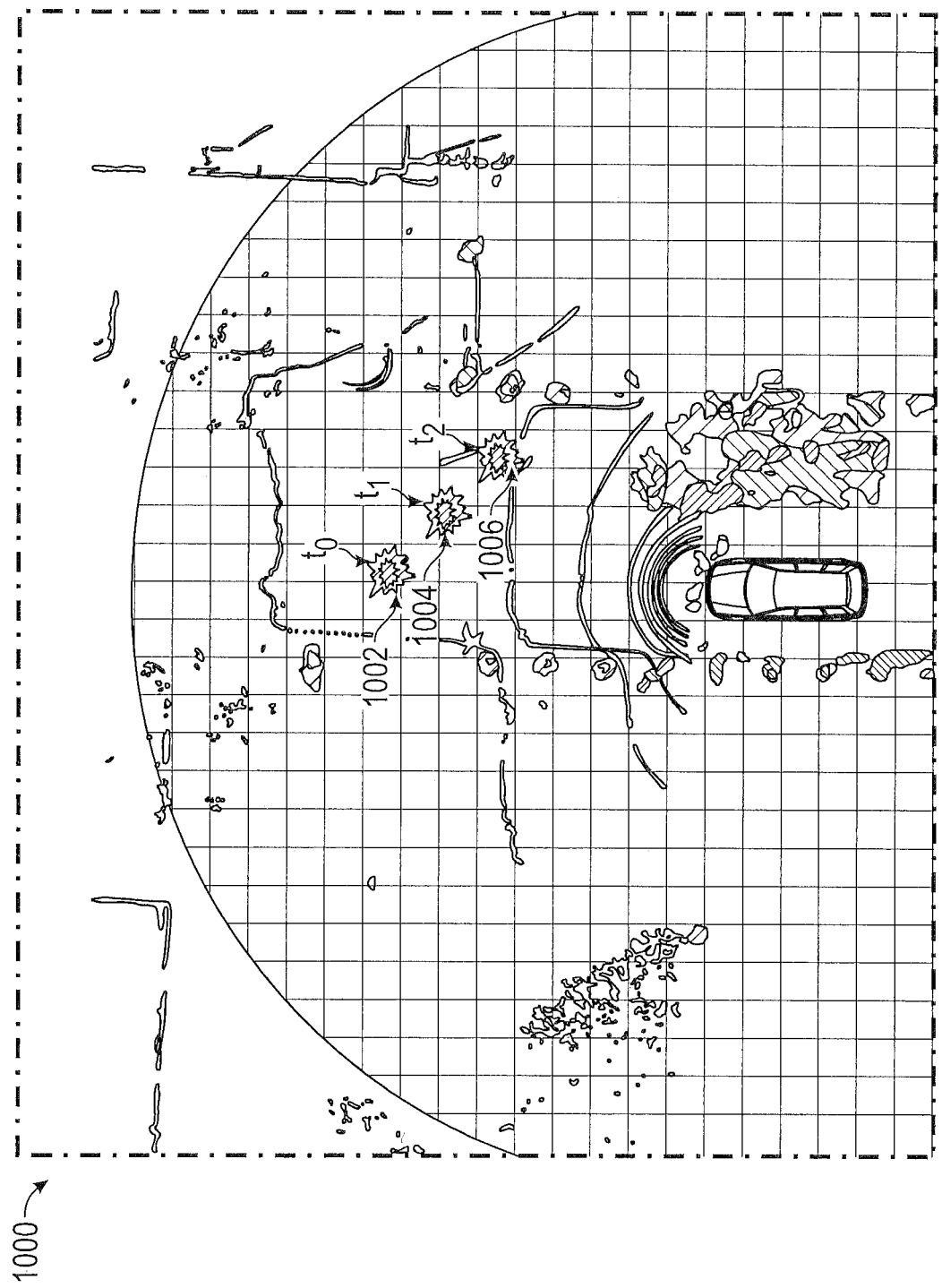
FIG. 10 shows the display of the illustrative radar field in the same scenario as FIG. 9, wherein the radar field is formed from an occupancy grid that uses the negative ISM disclosed herein.

FIGS. 9 and 10 illustrative differences in radar detections over time for a system that does not use the negative ISM for the occupancy grid vs. an occupancy grid disclosed herein that uses the negative ISM. FIG. 9 shows a display of an illustrative radar field in a scenario in which an object is passing in front of the vehicle, wherein the radar field is formed from an occupancy grid that does not use the negative ISM. The object is at a first location at time to, a second location at time $t_1$ and a third location at time $t_2$. However, at time $t_2$, the radar system is showing a persistent streak 902 of the object extending from the location of the object at time to to the location of the object at time $t_2$. The persistent streak 902 therefore indicates an object at time $t_2$ at locations at which the object no longer is present.

FIG. 10 shows the display of the illustrative radar field in the same scenario as FIG. 9, wherein the radar field is formed from an occupancy grid that uses the negative ISM disclosed herein. Rather than a persistent streak 902 as seen in FIG. 9, at time $t_0$, the radar field shows an object at location 1002. At a later time $t_1$, the objects is seen to have moved from location 1002 to new location 1004. At later time $t_2$, the radar field shows the object has once again moved, this time from location 1004 to location 1006. The radar field at each time step therefore shows only a localized representation of the object that is a suitable representation for the particular time step.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of mapping an environment, comprising:
computing a plurality of radial components and a plurality of angular components for a positive inverse sensor model (ISM) of an occupancy grid;
obtaining a detection at a sensor from an object in an environment surrounding a vehicle;
selecting a radial component corresponding to a range of the detection from the plurality of radial components and selecting an angular component corresponding to an angle of the detection from the plurality of angular components;
multiplying the selected radial component and the selected angular component to create an occupancy grid for the detection; and
mapping the environment using the occupancy grid.

2. The method of claim 1, wherein the ISM further comprises a negative ISM and a probability value of the negative ISM is assigned using a quad-tree structure of the occupancy grid.

3. The method of claim 2, wherein a node of the quad-tree structure corresponds to a solid angle and a first level of the quad-tree structure includes solid angle bins that combine to cover a field of view of the sensor.

4. The method of claim 3, further comprising partitioning a solid angle bin at a level of the quad-tree structure into a plurality of sub solid angles at a sub level of the quad-tree structure when the solid angle bin at the level is includes the detection.

5. The method of claim 4, further comprising assigning a probability value to a solid angle bin for which there is no detection, wherein the probability value reflects an absence of the detection in the solid angle bin.

6. The method of claim 2, further comprising combining the probability values from the negative ISM with a probability value from the positive ISM to create the occupancy grid.

7. The method of claim 1, further comprising navigating the vehicle with respect to the object based on the mapping of the environment.

8. A system for mapping an environment at a vehicle, comprising:
a sensor configured to obtain a detection from an object in an environment surrounding the vehicle; and
a processor configured to:
compute a plurality of radial components and a plurality of angular components for a positive inverse sensor model (ISM) of an occupancy grid;
select a radial component corresponding to a range of the detection from the plurality of radial components and selecting an angular component corresponding to an angle of the detection from the plurality of angular components;
multiply the selected radial component and the selected angular component to create an occupancy grid for the detection; and
map the environment using the occupancy grid.

9. The system of claim 8, wherein the processor is further configured to assign a probability value of a negative ISM of the occupancy grid using a quad-tree structure of the occupancy grid.

10. The system of claim 9, wherein a node of the quad-tree structure corresponds to a solid angle and a first level of the quad-tree structure includes solid angle bins that combine to cover a field of view of the sensor.

11. The system of claim 10, wherein the processor is further configured to partition a solid angle bin at a level of the quad-tree structure into a plurality of sub solid angles at a sub level of the quad-tree structure when the solid angle bin at the level includes the detection.

12. The system of claim 11, wherein the processor is further configured to assign a probability value to a solid angle bin for which there is no detection, wherein the probability value reflects an absence of the detection at the solid angle bin.

13. The system of claim 9, wherein the processor is further configured to combine the probability values from the negative ISM with a probability value from a positive ISM to create the occupancy grid.

14. The system of claim 8, wherein the processor is further configured to navigate the vehicle with respect to the object based on the mapping of the environment.

15. A vehicle, comprising:
a sensor configured to obtain a detection from an object in an environment surrounding the vehicle; and
a processor configured to:
compute a plurality of radial components and a plurality of angular components for a positive inverse sensor model (ISM) of an occupancy grid;
select a radial component corresponding to a range of the detection from the plurality of radial components and selecting an angular component corresponding to an angle of the detection from the plurality of angular components;
multiply the selected radial component and the selected angular component to create an occupancy grid for the detection; and
map the environment using the occupancy grid.

16. The vehicle of claim 15, wherein the processor is further configured to assign a probability value to a negative ISM of the occupancy grid using a quad-tree structure of the occupancy grid.

17. The vehicle of claim 16, wherein a node of the quad-tree structure corresponds to a solid angle and a first level of the quad-tree structure includes solid angle bins that combine to cover a field of view of the sensor.

18. The vehicle of claim 17, wherein the processor is further configured to partition a solid angle bin at a level of the quad-tree structure into a plurality of sub solid angles at a sub level of the quad-tree structure when the solid angle bin at the level includes the detection.

19. The vehicle of claim 18, wherein the processor is further configured to assign a probability value to a solid angle bin for which there is no detection, wherein the probability value reflects an absence of the detection at the solid angle bin.

20. The vehicle of claim 16, wherein the processor is further configured to combine the probability values from the negative ISM with a probability value from a positive ISM to create the occupancy grid.

* * * * *